US009596186B2

(12) United States Patent
Johnsen et al.

(10) Patent No.: US 9,596,186 B2
(45) Date of Patent: Mar. 14, 2017

(54) MULTIPLE PROCESSES SHARING A SINGLE INFINIBAND CONNECTION

(75) Inventors: Bjørn Dag Johnsen, Oslo (NO); Rabin A. Sugumar, Sunnyvale, CA (US); Ola Torudbakken, Oslo (NO)

(73) Assignee: Oracle America, Inc., Redwood Shores, CA (US)

( * ) Notice: Subject to any disclaimer, the term of this patent is extended or adjusted under 35 U.S.C. 154(b) by 2278 days.

(21) Appl. No.: 12/495,586

(22) Filed: Jun. 30, 2009

(65) Prior Publication Data
US 2010/0329275 A1 Dec. 30, 2010

(51) Int. Cl.
H04L 12/56 (2006.01)
H04L 12/863 (2013.01)
H04L 12/867 (2013.01)

(52) U.S. Cl.
CPC .......... H04L 47/621 (2013.01); H04L 47/629 (2013.01)

(58) Field of Classification Search
CPC .......... H04L 2012/5681; H04L 67/621; H04L 67/629; H04L 47/6295; H04L 47/621; H04L 47/629; H04L 12/5694; H04L 47/6285; H04L 49/90
USPC .......... 370/412; 714/56; 709/212, 238, 245; 710/22
See application file for complete search history.

(56) References Cited

U.S. PATENT DOCUMENTS

| | | | |
|---|---|---|---|
| 5,448,698 A | 9/1995 | Wilkes | |
| 6,125,399 A | 9/2000 | Hamilton | |
| 6,704,831 B1 * | 3/2004 | Avery | 710/310 |
| 6,813,653 B2 * | 11/2004 | Avery | 710/22 |
| 7,149,817 B2 * | 12/2006 | Pettey | 709/250 |
| 7,159,111 B1 * | 1/2007 | Ganapathy | 713/167 |
| 7,496,095 B1 | 2/2009 | Davis | |
| 7,668,984 B2 * | 2/2010 | Gregg et al. | 710/52 |
| 8,090,801 B1 * | 1/2012 | Pillai et al. | 709/219 |
| 2002/0073257 A1 * | 6/2002 | Beukema et al. | 710/105 |
| 2003/0023666 A1 | 1/2003 | Conway et al. | |

(Continued)

OTHER PUBLICATIONS

International Search Report and Written Opinion for Application No. PCT/US2010/026911, mailed Aug. 20, 2010; 15 pages.

(Continued)

*Primary Examiner* — Hoang-Chuong Vu
(74) *Attorney, Agent, or Firm* — Meyertons Hood Kivlin Kowert & Goetzel, P.C.; Jeffrey C. Hood

(57) ABSTRACT

A compute node with multiple transfer processes that share an Infiniband connection to send and receive messages across a network. Transfer processes are first associated with an Infiniband queue pair (QP) connection. Then send message commands associated with a transfer process are issued. This causes an Infiniband message to be generated and sent, via the QP connection, to a remote compute node corresponding to the QP. Send message commands associated with another process are also issued. This causes another Infiniband message to be generated and sent, via the same QP connection, to the same remote compute node. As mentioned, multiple processes may receive network messages received via a shared QP connection. A transfer process on a receiving compute node receives a network message through a QP connection using a receive queue. A second transfer process receives another message through the same QP connection using another receive queue.

19 Claims, 7 Drawing Sheets

(56) References Cited

U.S. PATENT DOCUMENTS

| | | | |
|---|---|---|---|
| 2003/0043805 A1* | 3/2003 | Graham et al. | 370/392 |
| 2004/0013088 A1* | 1/2004 | Gregg | H04L 12/5602 370/235 |
| 2004/0215848 A1* | 10/2004 | Craddock | H04L 49/90 710/39 |
| 2005/0060443 A1* | 3/2005 | Rosner | 710/33 |
| 2005/0100033 A1* | 5/2005 | Arndt | H04L 67/1097 370/412 |
| 2005/0144313 A1* | 6/2005 | Arndt et al. | 709/238 |
| 2006/0218316 A1* | 9/2006 | Biran | G06F 13/1657 710/54 |
| 2006/0236063 A1* | 10/2006 | Hausauer et al. | 711/170 |
| 2007/0226750 A1* | 9/2007 | Sharp et al. | 719/313 |
| 2008/0062927 A1* | 3/2008 | Zhu | G06F 9/3851 370/331 |
| 2008/0127203 A1 | 5/2008 | Huang et al. | |
| 2008/0270735 A1* | 10/2008 | Arndt et al. | 711/202 |
| 2009/0129392 A1* | 5/2009 | Kagan et al. | 370/392 |
| 2010/0146069 A1* | 6/2010 | Hefty et al. | 709/212 |
| 2010/0162272 A1* | 6/2010 | Arimilli | G06F 9/54 719/319 |

OTHER PUBLICATIONS

Office Action for U.S. Appl. No. 12/402,804, mailed Sep. 20, 2010; 16 pages.

"InfiniBand Architecture Specification vol. 1, Release 1.2.1"; InfiniBand Trade Assocation; Nov. 2007; 1727 pages.

Michael L. Scott; "Shared Memory Models"; Workshop on Communication and Middleware for Parallel Programming Models; Apr. 2002; 29 pages.

Leonidas Kontothanassis, Robert Stets, Galen Hunt, Umit Rencuzogullari, Gautam Altekar, Sandhya Dwarkadas, and Michael L. Scott; "Shared Memory Computing on Clusters with Symmetric Multiprocessors and System Area Networks"; ACM Transactions on Computer Systems, vol. 23, Issue 3, Aug. 2005; 33 pages.

Yong Xiong, Jyh-Charn Liu, and Wei Zhao; "On the Smoothing of Traffic Flows Using On-Off Control"; Real-Time Systems Symposium, Work-in-Progress Session, Dec. 3, 2003; 3 pages.

Fabrizio Petrini, Wu-Chun Feng, Adolfy Hoisie, Salvador Coll, and Eitan Frachtenberg; "The Quadrics Network: High-Performance Clustering Technology"; Los Alamos National Laboratory; IEEE Micro 22(1) Jan.-Feb. 2002; pp. 46-57.

* cited by examiner

MULTIPLE PROCESSES SHARING A SINGLE INFINIBAND CONNECTION

FIELD OF THE INVENTION

The present disclosure relates generally to clusters, and more particularly to a method for multiple processes to share a single Infiniband connection.

DESCRIPTION OF THE RELATED ART

A cluster generally refers to a group of computers that have been linked or interconnected to operate closely together, such that in many respects they form a single computer. Large clusters can comprise thousands of individual computer systems that have been linked together. The components (e.g., individual computers or "compute nodes") of a cluster are often connected to each other through local area networks via network adapters. Clusters generally provide greatly improved performance and/or availability over that provided by a single computer. A cluster is also typically more cost-effective than a single computer of comparable speed or availability.

A cluster generally comprises a plurality of compute nodes (e.g., servers) and the "interconnect" between these compute nodes. An important aspect to building large cluster systems is the interconnect. The interconnect may comprise a "fabric", e.g., the network that connects all of the servers together, as well as host adaptors that interface each of the computer systems (servers) to the fabric. One commonly used cluster interconnect is Ethernet. More recently, clusters have started using Infiniband as the interconnect. InfiniBand (IB) is a switched fabric communications link primarily used in high-performance computing and provides quality of service and failover features as well as scalability. An Infiniband interconnect generally provides lower latency, higher bandwidth, and improved reliability.

Many organizations such as research centers and national laboratories require large clusters with thousands of nodes to satisfy their compute requirements. It is very important to reduce the overhead of communication in such large clusters to allow applications to scale efficiently.

Communication protocols such as IB use a pair of queues on each side of a link to communicate as illustrated in FIG. 4. Such a pair of queues is called a "queue pair" or "QP". Compute node A 420 has a send queue 424 and a receive queue 426. Compute node B 440 has a send queue 446 and a receive queue 444. The send queue 424 on compute node A 420 is used to send messages to the receive queue 444 on compute node B 440. Similarly, the send queue 446 on compute node B 420 is used to send messages to the receive queue 426 on compute node A 420. The send queue 424 and receive queue 426 are part of a queue pair QP_A1 422 and the send queue 446 and receive queue 444 are part of a queue pair QP_B1 442. Both compute node A 420 and compute node B 440 may have many other queue pairs. In standard Infiniband, each queue pair has either one or two associated completion queues. In 400, the queue pair QP_A1 422 has a single associated completion queue 428 and queue pair QP_B1 442 has a single associated completion queue 448.

A message may be sent from compute node A 420 to compute node B 440 as follows. Software deposits a send work request in the send queue 424. A network adapter (considered to be part of compute node A) picks up this request and executes the message send. Similarly, software deposits a receive work request in the receive queue 444 from where another network adapter (considered to be part of compute node B) picks it up when the incoming message is received. The network adapter of compute node B 440 uses this work request to identify the correct receive buffer and to deposit the message payload. In addition, a completion record may be deposited (by the network adapter in compute node A) in completion queue 428 when the send work request has completed. Similarly, a completion record may be deposited (by the network adapter in compute node B) in completion queue 448 when the receive work request has completed.

In the Infiniband communication protocol known as Reliable Connection, where the protocol guarantees reliable, in-order delivery, a QP on one node is assigned to one and only one QP on some other node. This allows each QP to track sequence numbers and guarantee that packets are being received in order and force retries when there are missing packets.

In addition, in standard IB systems, one of the following is generally true.

1. An active queue pair is assigned to a single user process on an operating system.
2. The send queue is assigned to a single user process on an operating system. The receive queue is effectively divided into two parts, where the control parts (i.e., the entity that tracks sequence numbers and other control information) are assigned to a single process, and the data part (i.e., the entity that contains receive work requests) are shared among multiple processes.

The large number of send and receive queue structures required per node is a problem especially on multi-core systems. For instance, when there are N nodes and p processes per node and all-to-all communication is required, the total number of queue pairs per node is $(N-1)*p*p$. In large systems, N can be in the thousands and p is typically in the tens of processes (but may be higher as the number of cores per chip and hardware threads per core increases).

The large number of QPs has several negative impacts. First, each QP requires some storage space and this space, multiplied by the number of queue pairs per node, may add up to a significant amount. This storage space required for QPs is not available for application use.

Second, communications may be improved by holding QP state information, for active queue pairs, in the network adapter. When QP state information is not held in the adapter and a request arrives associated with that QP, the network adapter responds by loading the state information from memory, adding to overhead and latency. The more queue pairs there are, then the more often the adapter needs to access memory and the higher the overhead.

Third, the IB specification limits the number of QPs per adapter to 16 million. As system scale increases and the number of cores per chip grows, there is the danger that this limit will be exceeded in the near future.

SUMMARY OF THE INVENTION

Embodiments of the invention relate to sending messages across Infiniband (IB) networks using shared Queue Pair (QP) connections. Embodiments of the invention may have improved network performance, improved compute performance, may have reduced system cost and may be better able to support future system configurations.

In a compute node connected to an IB fabric, messages may be sent and received using a shared QP. Transfer processes may first be associated with an appropriate QP connection. Then send message commands associated with a transfer process are issued. The issuing of these commands may cause an IB message to be generated and sent, via the QP connection, to a remote compute node corresponding to the QP. At the same time or at a later time, other send message commands associated with another process may be issued. These commands may cause another Infiniband message to be generated and sent, via the same QP connection, to the same remote compute node. Also, multiple processes may receive network messages received via a shared QP connection. A transfer process on a receiving compute node may receive a network message through a QP connection using a receive queue. A second transfer process may receive another message through the same QP connection using another receive queue. A compute node may support sending messages using shared QPs or receiving messages using shared QPs or both sending and receiving messages using a shared QP.

The associating of a transfer process with a QP may comprise associating a set of addresses with a transfer process. These may be addresses in a network adapter or in system memory or in a variety of other locations on the compute node. These are the addresses to which the process issues transfer commands. For example, a first set of addresses may be associated with a first transfer process and a second set of addresses may be associated with a second transfer process. When the first transfer process wishes to send a network message it issues transfer commands to the first set of addresses. Similarly, when the second transfer process wishes to send a network message it issues transfer commands to the second set of addresses. If these two transfer processes are to use a shared QP, then the system may be preconfigured so that network messages generated by issuing commands to these two sets of address are sent using the same shared QP.

The association of a set of addresses with a transfer process may involve mapping the addresses into an address space that is accessible to the transfer process and is inaccessible to other transfer processes. This feature may provide security for the system and may prevent rogue or buggy software from making unwanted accesses or sending unwanted messages or disrupting the compute node or disrupting a networked group of computers.

Depending on the embodiment, the message commands issued by a transfer process may take a variety of forms and functions. For example, a message command may define a portion of the message packet (e.g. a message header field) or it may configure the message (e.g. define its length) or it may initiate the generation of the message packet and the transmission of the message across the network. Indeed, a single message command may perform one or more the above functions.

Also, a message command may contain completion queue select data. This information may allow each process that uses a shared QP to specify a completion queue for messages sent by that process. For multiple processes that share a QP, this allows each process to avoid having to share a completion queue. A compute node, having successfully completed the reception of a message, may (if so configured) send an acknowledgement to the sending node. The reception of such an acknowledgement can be the trigger for the placing of a completion record in an appropriate send completion queue. Note that a single completion queue can be used to track both send and receive completions.

Each completion queue may have an associated descriptor. Completion queue descriptors can be arranged in a tabular format so that a completion queue descriptor (and therefore the associated completion queue) can be selected by an index. A completion queue descriptor may contain one or more fields that may be used to control access to the associated completion queue. One descriptor field may contain information that can be used to determine if a transfer process (or associated circuitry) is allowed to access the associated completion queue. Another descriptor field may contain information that can be used to determine if a process associated with a certain QP is allowed to access the associated completion queue. So, for example, a completion queue associated with certain transfer process and a certain QP process may—through the information provided in the completion queue descriptor fields—permit access to that transfer process and that QP process but to no other transfer processes or QP processes.

The set of addresses associated with a given transfer process may comprise addresses of command buffers, addresses of control registers, addresses of message doorbells or a mixture of the listed address types. The issuing of commands may comprise one or more of the following, writing a command (e.g. to a command register, to a FIFO, or to a buffer), writing to a doorbell address with command information, writing to a doorbell address without command information and reading from a doorbell address. Any doorbell access may activate the doorbell.

The generation of a message may comprise placing receive queue information in the message. This information may allow transfer processes that use a shared QP for sending to send messages to the same destination QP but to different receive queues. When the message is received at a remote node, the receive queue information in the message may be used to select an appropriate receive queue, and then the payload of the message can be deposited in that selected queue. Since QPs may also be shared by receive processes, this scheme allows multiple receive processes to share a QP but avoid having to share the same receive queue. So, for example, two messages may be received across the same QP connection (sharing the same QP at the receive node) but the messages may be picked up by different receive processes. One message may be picked up by a receive process from a receive queue and the other message may be picked up by another receive process from another receive queue.

Each receive queue may have an associated descriptor. Receive queue descriptors can be arranged in a tabular format so that a receive queue descriptor (and therefore the associated receive queue) can be selected by an index. A receive queue descriptor may contain one or more fields that may be used to control access to the associated receive queue. One descriptor field may contain information that can be used to determine if a transfer process (or associated circuitry) is allowed to access the associated receive queue. Another descriptor field may contain information that can be used to determine if a process associated with a certain QP is allowed to access the associated receive queue. So, for example, a receive queue associated with certain transfer process and a certain QP process may—through the information provided in the receive queue descriptor fields—permit access to that transfer process and that QP process but to no other transfer processes or QP processes.

Systems that support the message sending across Infiniband connections using shared QP connections may comprise a processing unit that either comprises a network interface or may be coupled to a network interface. The processing unit may have multiple CPUs and it may include a memory that holds programming instructions that, when executed, perform one or more of the following sets of functional behaviors.

Firstly, two transfer processes may be associated with an Infiniband Queue Pair (QP) connection. A first set of transfer commands (associated with a first process) may be issued, causing a first message to be generated and sent, via the associated QP connection, to a remote node corresponding to the QP. A second set of transfer commands (associated with a second process) may be issued, causing a second message to be generated and sent, via the same QP connection, to the same remote compute node corresponding to the QP.

Secondly, a first set of system addresses may be associated with a first transfer process and a second set of addresses may be associated with a second transfer process. Send commands may be issued to the first set of addresses by the first transfer process, causing a first network message to be sent using a shared QP connection. Send commands may be issued to the second set of addresses by the second process, causing a second network message to be sent using the same, shared QP connection.

Thirdly and finally, a first message may be received by a first process, through a shared QP connection. A second message may be received by a second process, through the same, shared QP connection.

BRIEF DESCRIPTION OF THE DRAWINGS

A better understanding of embodiments of the present invention can be obtained when the following detailed description of the preferred embodiment is considered in conjunction with the following drawings, in which.

Figure 1:
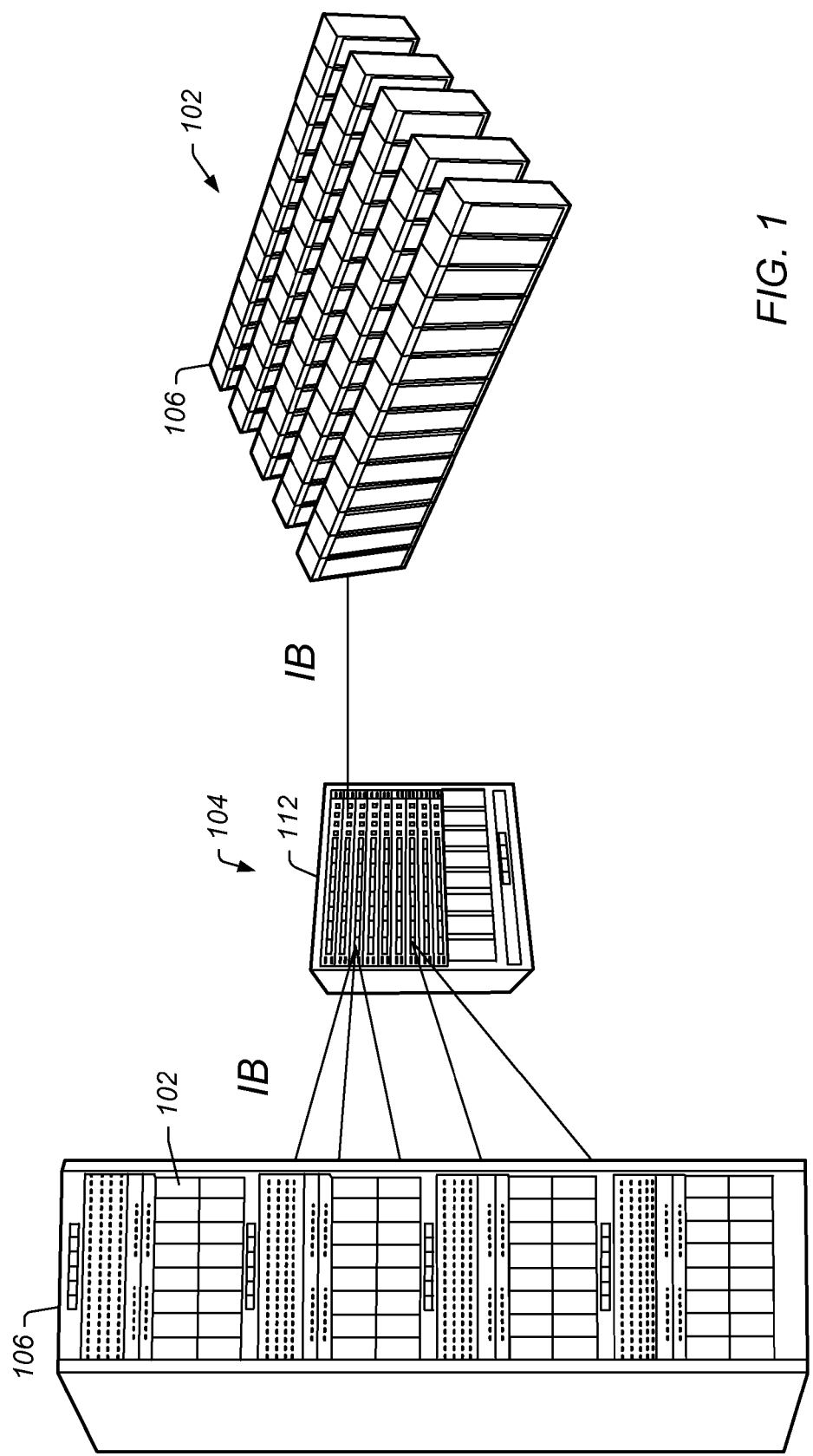
FIG. 1 illustrates an exemplary cluster according to one embodiment of the invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Definitions

Compute Node—refers to a computer system having a processor (or CPU) and memory. A Compute Node may have a single processor (which may be single core or multi-core) or may have a plurality of processors. One example of a Compute Node is a blade server.

Local Node—refers to the Compute Node corresponding to a local reference. For example, the Compute Node associated with a particular CPU would be the CPU's local node.

Network Fabric—refers to a network or interconnect for connecting multiple Compute Nodes.

Compute Node Interface Device (or "Network Adaptor")—refers to an interface for coupling a Compute Node to a Network (or Network Fabric).

Remote Location—refers to a location on another machine on a network.

FIG. 1 illustrates an exemplary cluster system according to one embodiment of the invention. As shown, the system may comprise a plurality of computer systems or compute nodes 102 that are connected together by an interconnect 104. The compute nodes 102 may take various forms. In the embodiment of FIG. 1, the compute nodes 102 comprise blade servers that are housed in one or more racks 106. The interconnect 104 may comprise a fabric switch 112 as shown. The interconnect 104 may support only a single protocol, or may support a plurality of protocols. In the exemplary embodiment shown, the interconnect 104 may support the Infiniband (IB) protocol.

On the left side of exemplary FIG. 1, the cluster comprises one or more racks 106 each comprising 4 blade server chassis' which each comprise a plurality of blade servers (compute nodes) 102. The blade servers 102 on the left connect to the fabric switch 112 through Infiniband. In one embodiment, the blade servers 102 connect to the fabric switch 112 over Infiniband in all cases. As shown on the right side of FIG. 1, the fabric switch 112 may couple to additional racks 106 having additional compute nodes 102.

Each of the compute nodes 102 may couple to (or comprise) a compute node interface device, also referred to herein as a "Network Adaptor" or Scalable Interface (SIF), (110 FIG. 2) which provides an interface for the respective compute nodes 102. The compute node interface device or SIF 110 couples to a respective compute node 102 and provides an IB interface for the compute node 102 to the fabric 104, e.g., to the fabric switch 112. The compute node interface device 110 is mostly referred to herein as a "Network Adaptor" for the sake of convenience.

Figure 2:
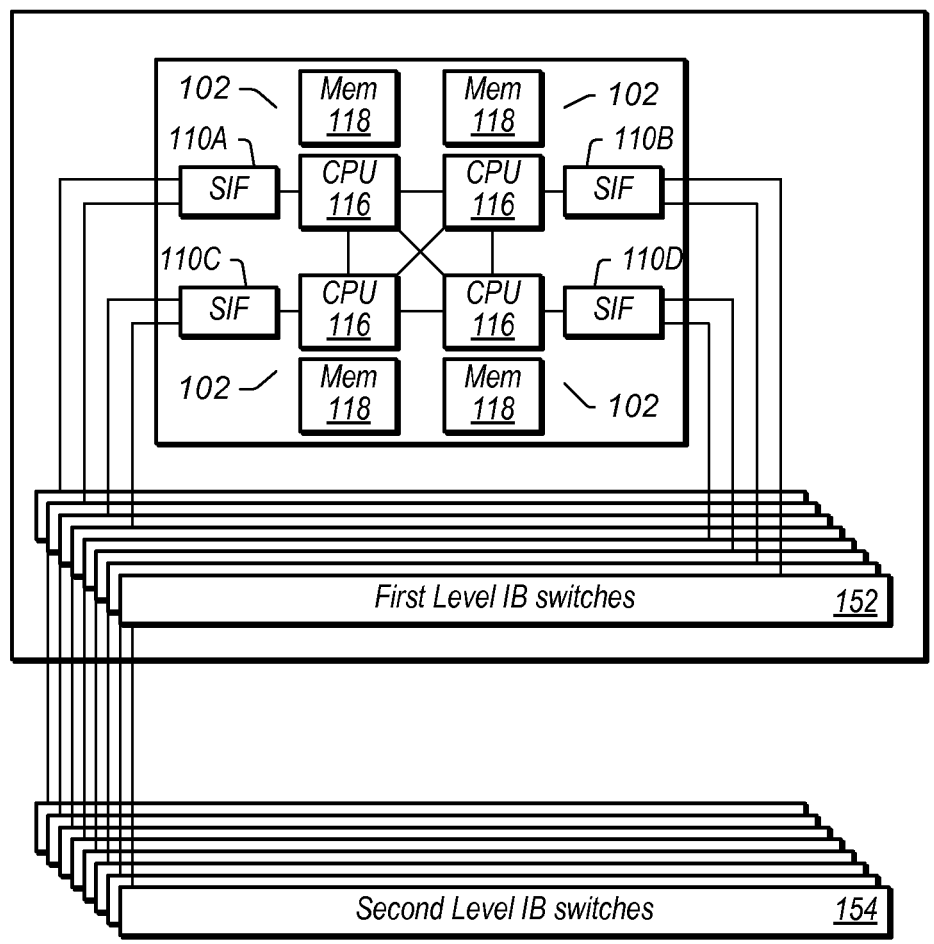
FIG. 2 is a block diagram of a portion of the cluster of FIG. 1, showing an exemplary compute node (4 server blade) connected to several levels of switches.

FIG. 2 is a block diagram illustrating a portion of a cluster system comprising an exemplary server blade (compute node 102) connected to form the cluster. Each compute node 102 comprises a corresponding Scalable Interface (SIF) block (compute node interface device or network adaptor) 110 (labeled as 110A-110D). Each CPU (or compute node) 102 couples to its respective Scalable Interface (SIF) 110A-D also located on the blade server. The SIF blocks 110 (110A-110D) each provide an Infiniband interface to a respective compute node 102. The SIF blocks 110 (110A-110D) each comprise a host interface for coupling to the host bus or processor bus of its respective compute node 102, as well as an Infiniband interface. The SIF block 110 is discussed in more detail with respect to FIG. 3.

Each of the SIF blocks 110 (110A-110D) may couple to Infiniband switches 152, referred to in FIG. 2 as First Level IB switches 152. The First Level IB switches 152 in turn may couple to Second Level IB switches 154, as shown. The First Level IB switches 152 may couple to the Second Level IB switches 154 through cables, as shown. There may be additional levels of IB switches.

Figure 3:
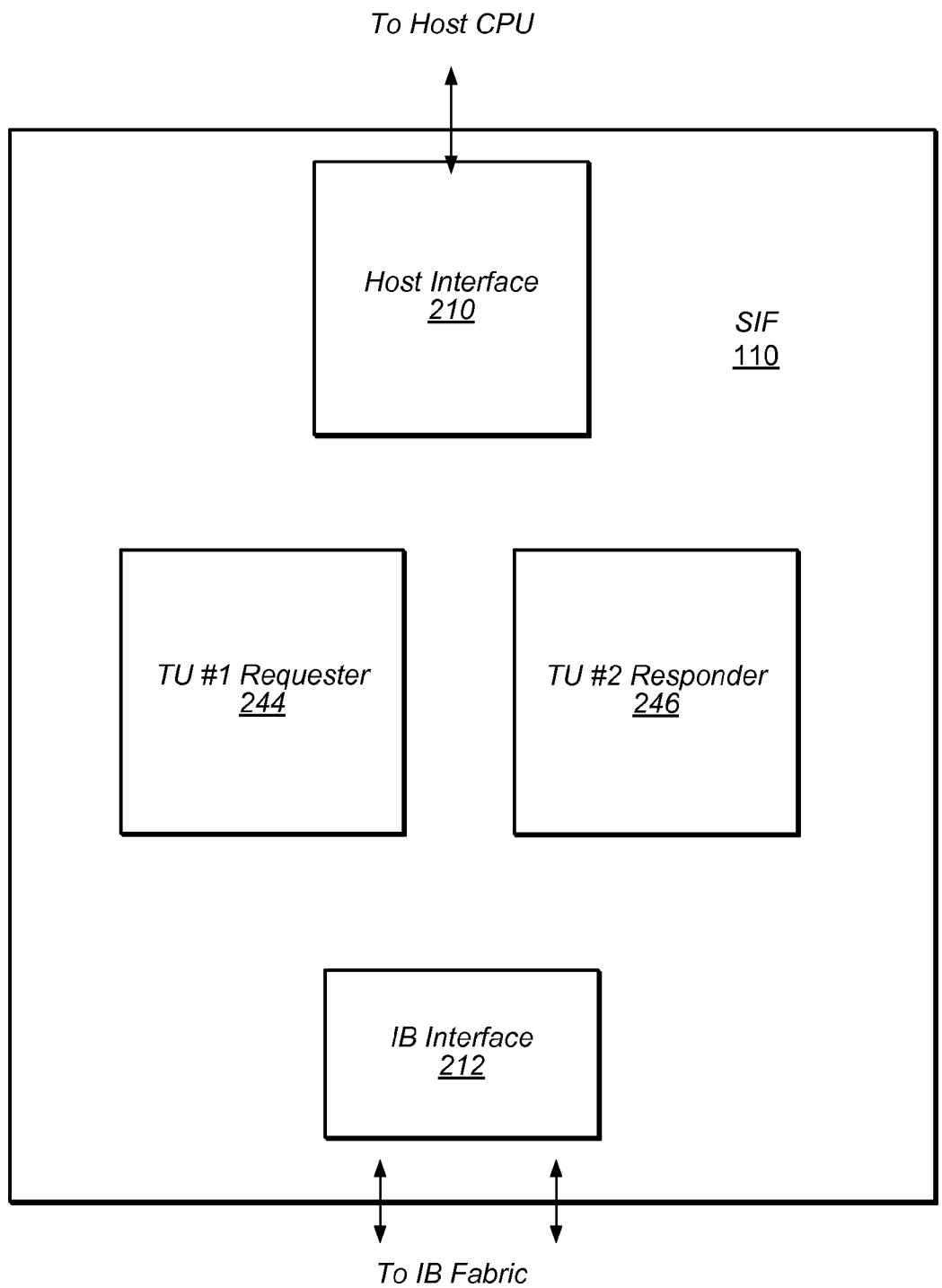
FIG. 3 is a block diagram of an exemplary scalable interface (SIF) used in interconnecting the various compute nodes in the cluster of FIG. 1.

FIG. 3 is a block diagram of an exemplary Scalable Interface (SIF) block (compute node interface device or network adaptor) 110. The SIF network adapter 110 operates as an interface or I/O adapter for each compute node 102 in the cluster. In one embodiment, the SIF 110 does not include a general purpose CPU and does not execute an operating system, and hence is a hardware-centric structure. The SIF 110 provides various services in hardware that would normally require software execution.

As shown, the SIF block 110 includes a host bus interface 210 for coupling to a computer system, e.g., in blade server 102. The SIF block 110 also includes a network fabric interface such as Infiniband interface 212, for coupling to Infiniband, e.g., for coupling to the network fabric 104.

The exemplary SIF block 110 may comprise a TU#1 (Transaction Unit) Requestor block 244 and TU#2 Responder block 246. The TU#1 Requestor block 244 may generate/process requests that are provided to other computer systems. The TU#2 Responder block 246 may be responsible for responding to incoming packets, e.g., incoming send requests from other compute nodes 102. The TU#1 Requestor block 244 and the TU#2 Responder block 246 may each couple to the host bus interface 210 and the IB interface 212.

TU#1 244 may be the Requester TU. In one embodiment, all requests sent by SIF 110 go through one of the TUs. SIF 110 may support the Infiniband (IB) reliable communication protocol, whereby in one implementation every request is properly acknowledged by the receiver before the request is completed at the sender. SIF 110 may support multiple command registers for applications to deposit commands—each command register typically dedicated to a host process running on a core. As the deposited commands are kicked off with doorbells, the commands may merge into a stream of commands that then feeds into the TU scheduler which schedules them onto available threads/command-slots on the 64 thread engine. A doorbell is a write issued by software running on a CPU to an address mapped to a device (such as a network adapter) which causes the device to perform some action (such as sending a packet over the network fabric). Thus a doorbell is analogous to a house doorbell in the sense that it tells the device that some new action is needed.

TU#2 246 may be the Responder TU. All incoming requests may be directed to the Responder TU (TU#2) 246 which processes the packet, ultimately delivering the packet to off-chip or on-chip memory or to other logic for processing collectives. The Responder TU (TU#2) 246 may access a header matching block comprising a large header store that can hold many thousands of headers, a buffer to hold a send request payload when a matching receive is not immediately found, and one or more matcher units to perform multiple searches, e.g., in parallel. When a successful match is found, the incoming payload may be directly copied into the receive buffer in memory.

The SIF 110 may comprise transfer management circuitry which manages transfers as described herein. The transfer management circuitry is coupled to the host interface 210 and the network interface 212. The transfer management circuitry may be comprised in one or more of the host interface 210, the TU#1 244 and/or the TU#2 246.

Infiniband and Shared QPs

As previously described, Infiniband systems may be negatively impacted by supporting a large number of QPs. One approach to limit the number of QPs per node is to share QPs among multiple processes. In an IB networked system with N nodes and p processes per node (where all processes and all nodes communicate with each other) if all processes on a given node can share one QP to each remote node, the number of QPs per node will be N−1, instead of (N−1)*p*p earlier—a substantial saving. However, sharing QPs among processes presents challenges, including send queue handling, completion queue handling and receive queue selection. Each of these challenges is now described in more detail.

One way to allow multiple processes to share a QP is to allow multiple processes to have access to the same send queue. This may be done either through different processes acquiring locks prior to accessing the send queue, or by arbitrating access to the send queue through the kernel. Both these approaches can add a substantial overhead, and, in the case of the lock approach, there may also be security issue where processes may access send queue entries of other processes when a single send queue is shared.

In the standard Infiniband specification a QP has one completion queue for sends and the same (or another) completion queue for receives. When multiple processes share a single QP that relationship between QPs and completion queues becomes problematic since it compromises each process's ability to track its own completions separately.

As previously noted, the Infiniband specification allows multiple QPs to target a single receive queue. However, in existing Infiniband systems, each receive queue is generally assigned to a single receive process allowing each process to access messages targeted to it. However, when a single QP is shared by multiple receive processes, and there is only one receive queue for that QP, it will be difficult for a receive process to determine which messages are intended for it and which are intended for other processes.

QP Sharing Flow

Figure 4:
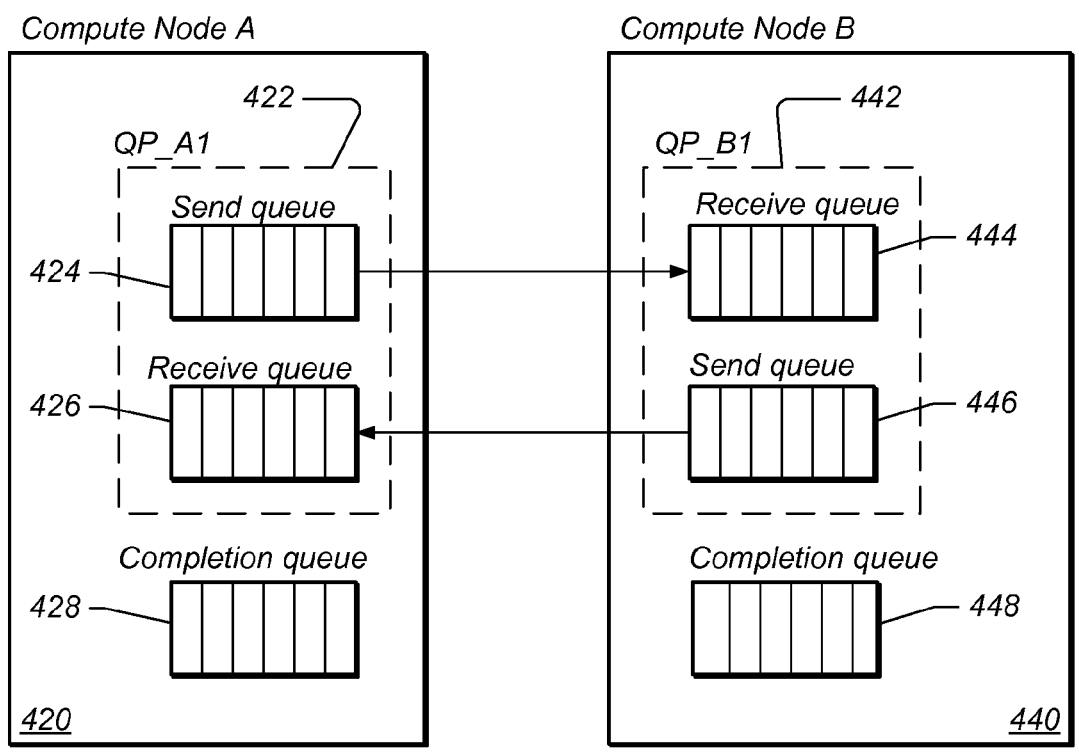
FIG. 4 is a block diagram showing a pair of compute nodes communicating using Infiniband queue-pairs according to the prior art.
Figure 5:
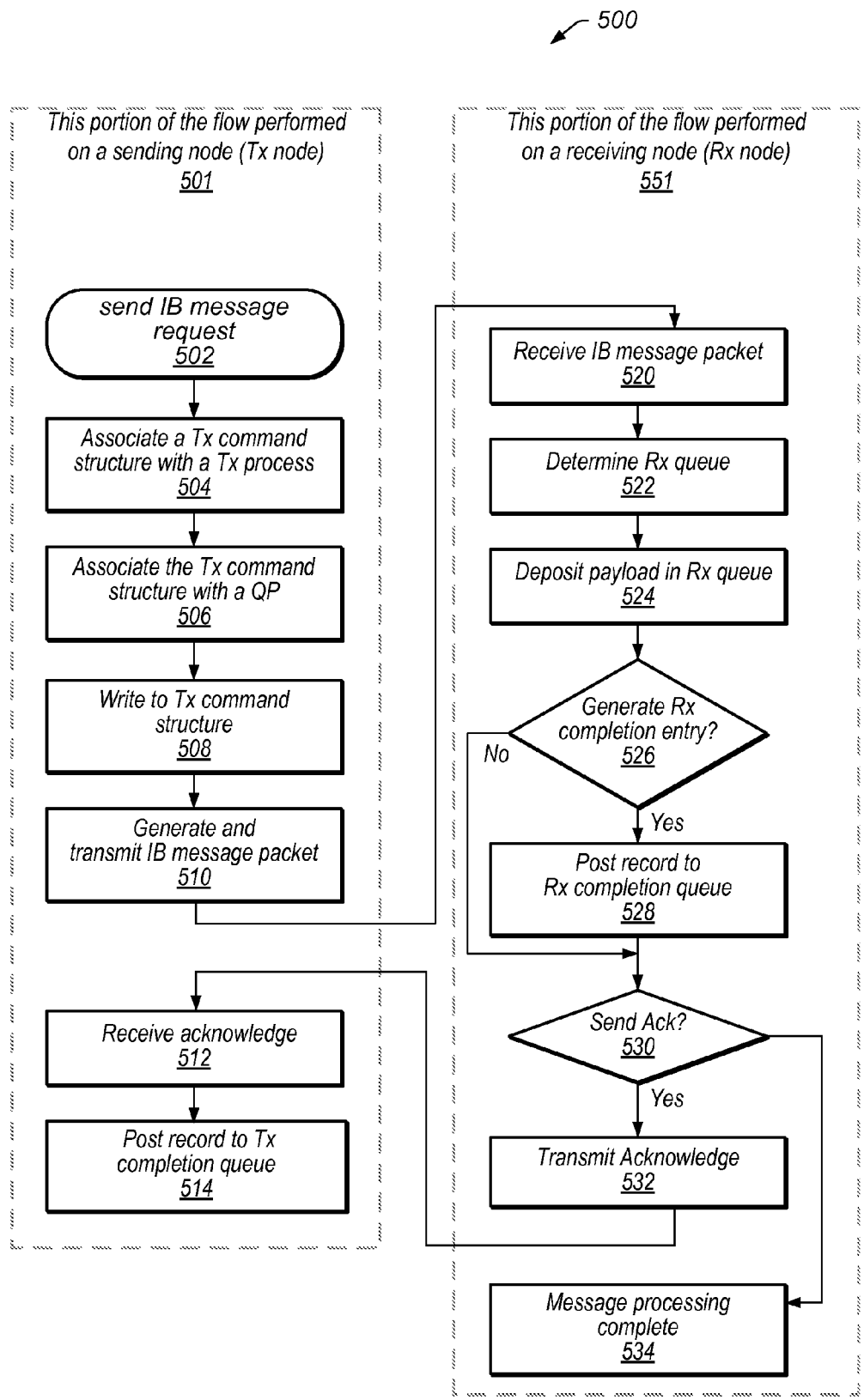
FIG. 5 is a flowchart diagram illustrating Infiniband communication using shared QPs.

FIG. 5 shows an exemplary flow 500 for communicating (sending a message) across Infiniband using shared QPs. The flow may be performed by two communicating compute nodes. A portion of the flow 501 may be executed on a message sending node and another portion of the flow 551 may be executed on a message receiving node. These nodes may be similar to compute nodes 420 and 440 shown in FIG. 4.

Flow starts with a process running on a local compute node requesting to send an IB message to a remote compute node. For ease of discussion, this local compute node is considered to be the sending node (or Tx node) and the process making the request is considered to be the sending process (or Tx Process). Additionally, the remote compute node is considered to be the receiving node (or Rx node) and the process receiving data on the remote compute node is considered the receiving process (or Rx Process). Of course, the local compute node may also receive messages and the remote node may also send messages.

Privileged software (possibly including the operating system) running on the sending node associates a transmit command structure with the sending process 504. This command structure may include memory mapped elements such as command buffers, command storage locations, pointers, doorbells, flags, status registers etc.—some of which may be integrated onto a network adapter device. The process of association may involve mapping addresses associated with portions of the command structure into the address space of the Tx process.

The privileged software also associates the Tx command structure with a local QP 506. It is assumed that, in this example, privileged software running on local and remote nodes has previously created and configured a pair of linked QPs for the purposes of performing IB communications between the sending node and the receiving node. Once these setup actions are completed, the Tx process initiates a message send to the remote node by writing send commands to the associated command structure 508. Note that a portion of the send commands comprise a receive queue (Rx queue) identifier that is included (perhaps in a different form) in the message header.

Writing to the command structure causes a message packet (including message header) to be generated and transmitted 510 by a network adapter on the local compute node. The message packet is transported across IB fabric to the remote compute node, where it is received 520 by the previously linked QP. The network adapter on the remote compute node examines the message header and, using the Rx queue identification data, deposits the message payload in the correct Rx queue 524. The Rx queue may (or may not) have an associated valid completion queue. If there is an associated valid completion queue, the receive process chooses 526 to post a record in the Rx completion queue 528. Following this, the receive node determines whether to send an acknowledgement to the sending node 530 in order to confirm receipt. If it decides to do so, it transmits an acknowledgement 532 across the IB fabric to the send node. When the sending node receives the acknowledgement 512, it posts a completion record to the Tx completion queue 514 specified by the associated commands written to the Tx command structure. If the Rx node determines that it should not send an acknowledgement message processing is essentially complete 534.

Note that once steps 504 and 506 are performed for a given pair of Tx and Rx processes on a given pair of Tx and Rx nodes, these steps may not need to be performed for additional messages sent from the Tx process to the Rx process. In addition, other send processes on the Tx node and Rx node can send messages to other receive processes on the Rx node and Tx using the same pair of linked QPs but using different send command structures, Rx queues, Rx completion queues and Tx completion queues.

Details of an Exemplary Embodiment

The communications system just described can be implemented in a variety of ways. The following section describes software and hardware structures in an exemplary embodiment of the invention. Note that in the following description certain structures may be defined as being on a network adapter or in system memory. However, in other embodiments, these structures may be implemented differently and may be found in other locations.

In the exemplary embodiment, the transmit command structure comprises a collect buffer and an associated doorbell.

Collect Buffer

There is a set of collect buffers on the network adapter. Each collect buffer is assigned to one process. When a process wants to issue a send command, instead of placing the command in a queue, and then have the adapter read it, the process writes the command into the collect buffer, and then issues a doorbell (described below) to initiate the send. Each collect buffer is large enough to hold an entire send command and may be sized larger to hold multiple commands.

Figure 6:
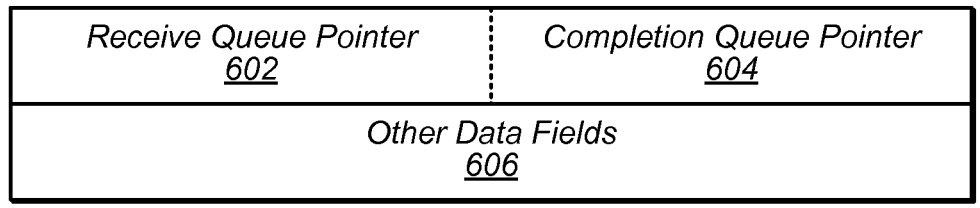
FIG. 6 illustrates an exemplary collect buffer structure.

A diagram of an exemplary collect buffer structure is shown in FIG. 6. The collect buffer 600 is comprised of multiple fields including a receive queue pointer field 602, a completion queue pointer field 604 and other data fields 606. The receive queue pointer field entry identifies the receive queue to be used for the associated message. It points to a receive queue descriptor in a receive queue descriptor table on the remote receiving node. The completion queue pointer field identifies the completion queue (on the sending node) to be used for the associated message. It points to a completion queue descriptor in a completion queue descriptor table. The completion queue descriptor will be described shortly.

Doorbells

A doorbell is an address that is recognized by the network adapter to have special meaning. Each doorbell address may be associated with a collect buffer and a QP. The total number of doorbell addresses may be the product of the number of collect buffers and the number of active QPs. Note that there are few hardware resources associated with a doorbell—it is just an address that has special meaning. Loads or stores to these special addresses that arrive at the adapter may cause the command that is written into the collect buffer earlier to be initiated to the QP that the doorbell address is assigned to. A doorbell address may be mapped into the address space of the process which is associated with the collect buffer corresponding to the doorbell. By controlling what doorbell addresses are mapped to a process, an operating system may control which QPs a process may access. When a doorbell is accessed through a store, the data written by the doorbell could also carry command information.

Network Adapter Buffers

Once a command is initiated by a doorbell it enters a set of network adapter buffers from where the network adapter processes them in sequence.

QP State

Each QP has associated state information. This includes information such as the sequence number to use to send packets, sequence number expected on incoming packets, the type of QP, what (if any) transmission is in progress at any point, protection domain defining a security space that the QP is operating under and other such information. The QP state entry is created by the operating system at the time a QP is setup. The QP state entry may be located in system memory, or in memory attached to the network adapter. The adapter needs to access the QP state entry to send and receive packets on a QP.

Completion Queue Descriptor

Figure 7:
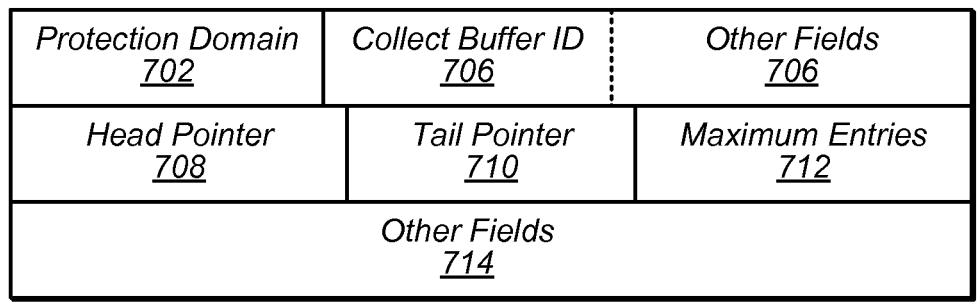
FIG. 7 illustrates an exemplary completion queue descriptor.

The completion queue pointer 604 is part of the command written into the collect buffer structure 600. Instead of associating a completion queue with a QP, it is specified in the send command, allowing send commands issued from different processes to specify different completion queues. Each completion queue has an associated descriptor on the network adaptor (see FIG. 7). The descriptor 700 comprises: a head pointer 708 for the completion queue 708, tail pointer for the completion queue 710, maximum queue size field 712, protection fields (702, 704) and other miscellaneous fields (706, 714). The memory may store a table of such completion descriptors. The completion queue pointer field 604 in the collect buffer structure 600 may be an index into the descriptor table.

Note that there are two types of protection information included in the completion queue descriptor. The Protection Domain field 702 is a key used to determine if a QP may access this completion descriptor. The Protection Domain in the completion queue descriptor is preferably the same as the protection domain in the QP state to allow access. The collect buffer ID 704 may be used to determine if a request originating from a particular collect buffer 600 may access the completion queue associated with this descriptor. In this embodiment a completion queue may be accessed only through a single collect buffer but more flexible schemes are possible.

Receive Queue Descriptor

Figure 8:
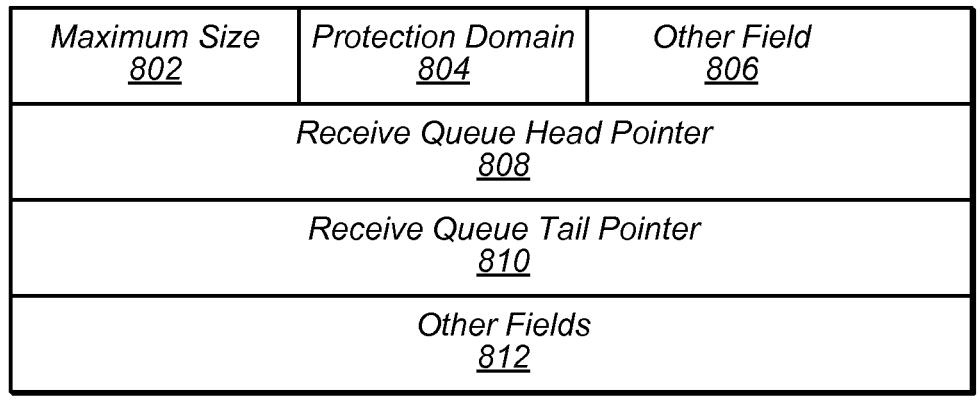
FIG. 8 illustrates an exemplary receive queue descriptor.

The receive queue pointer 602 is part of the command written into the collect structure 600. Instead of associating a QP with a specific receive queue on the remote side, the receive queue may be specified as part of the command. Each receive queue may have an associated descriptor (FIG. 8) on the network adapter. The receive queue descriptor 800 may comprise: a maximum size field 802, a protection domain (PD) field 804, a head pointer for the receive queue 808, a tail pointer for the receive queue 810, and other miscellaneous fields (806, 812). In one embodiment the memory stores a table of such receive queue descriptors. The receive queue pointer field 602 in the collect buffer structure 600 may provide an index into the receive queue descriptor table at the remote node. A receive queue descriptor is preferably in the same protection domain as the QP for a QP to deposit messages in the receive queue. The receive queue descriptor may also include a completion queue pointer where a completion is posted when a receive work request is completed.

Figure 9:
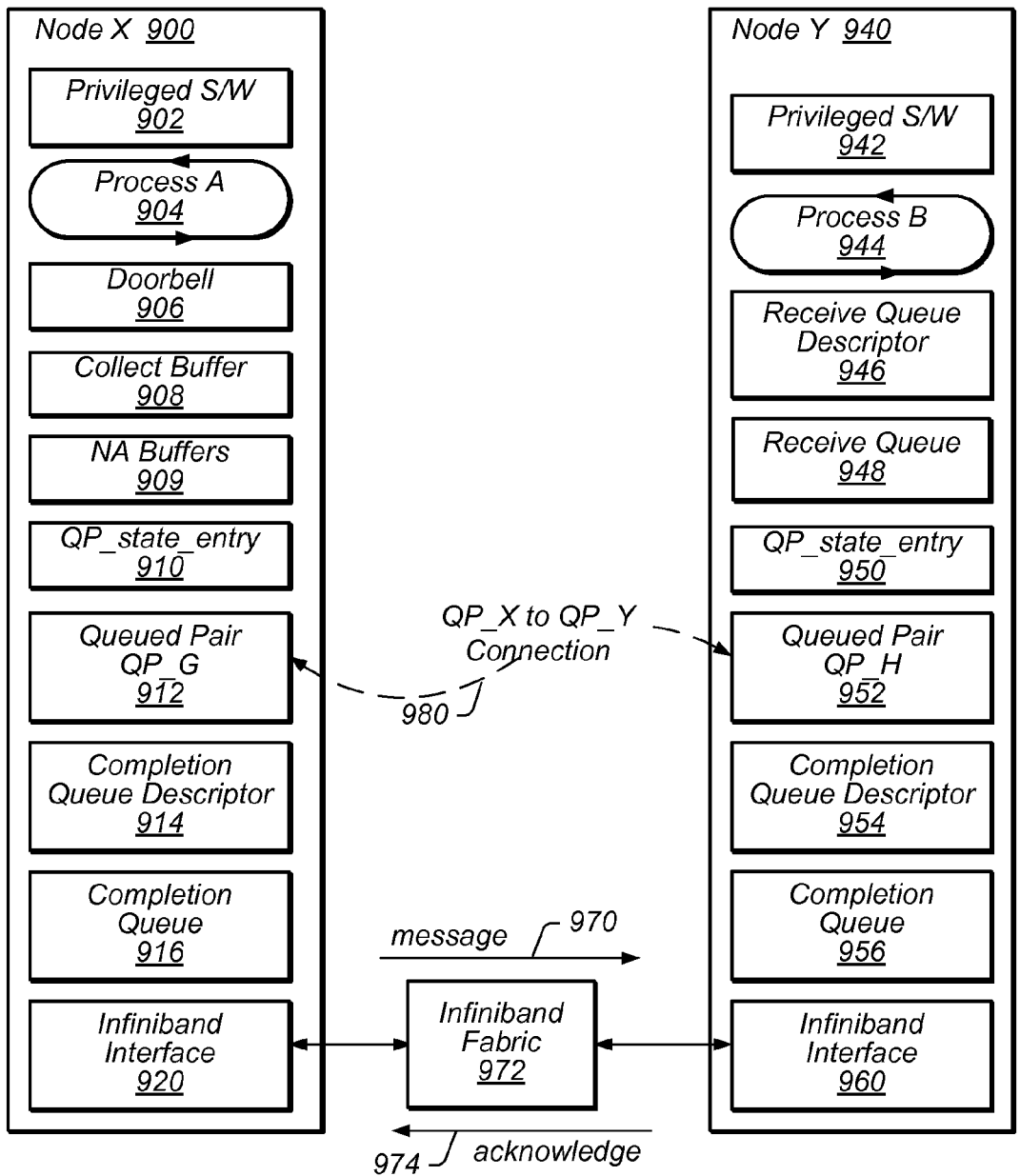
FIG. 9 illustrates the hardware and software components of an exemplary embodiment.

One embodiment of the QP sharing flow (FIG. 5), in combination with the exemplary software and hardware structures just described, is illustrated in FIG. 9. In this system, a process "A" 904 running on compute node "X" 900 wishes to send a message to a process "B" 944 running on a second compute node "Y" 940 over an Infiniband fabric 972. In this embodiment, processes (including A) running on Node X 900 that communicate with processes (including B) running on node Y 940 do so via the queue-pair "QP_G" 912. In addition, processes (including B) running on Node Y 940 that communicate with processes (including A) running on node X 900 do so via the queue pair "QP_H" 952. For diagrammatic simplicity and ease of discussion, both Node X and Node Y are both assumed to comprise network adapters although in practice network adapters may be coupled to compute nodes and not incorporated onto them. Note that Node X is equivalent to the Tx node associated with FIG. 5 and that Node Y is equivalent to the Rx node in FIG. 5. Note also that Node X is similar to compute node A in FIG. 4 and Node Y is similar to compute node B in FIG. 4.

Before process A 904 sends a message to process B 944, some setup may be performed. The operating system and/or other privileged software (PSW) 902 running on compute node X 900 may set up a QP state entry 910 for QP_G 912. PSW 902 may also assign a doorbell 906 to a collect buffer 908 and assign both (906, 908) to QP_G 912. PSW 902 may also map the addresses of doorbell 906 and collect buffer 908 into the address space of process A 904. PSW 902 may also create a completion queue descriptor 914 in which the protection domain corresponds to QP_G 912 and in which the collect buffer identification field corresponds to collect buffer 908.

PSW 942 running on node Y 940 sets up a QP state entry 950 for QP_H 952 and establishes a connection between QP_H 952 and QP_G 912 by communicating with PSW 902 running on node X 900. PSW 942 also creates a receive queue descriptor 946 (with a protection domain corresponding to QP_H 952) and associated receive queue 948. Additionally, PSW 942 creates a completion queue descriptor 954 and completion queue 956, both of which are associated with receive queue 948. The receive queue 948 may be accessed by process B 944 running on Node Y 940.

When process A 902, running on Node X 900, wishes to send a message to process B 944, running on node Y 940, it writes a send command into collect buffer 908 and then issues a load or store to doorbell 906. This doorbell 906 access triggers the send command. The command is transferred into network adapter (NA) buffers 909 and is then processed by the network adapter. Part of the processing involves the creation of an Infiniband message packet. A pointer to a remote receive queue descriptor 946 is carried in the message packet header and this identifies the receive queue 948 to be used for the message. The message packet 970 is sent from Node X 900 across the Infiniband Fabric 972 to Node Y 940.

QP_H 952 on node Y 940 receives the message packet 970. Using the receive queue pointer carried in the message header, the appropriate receive queue descriptor 946 is selected. After checking that the protection domain associated with QP_H 952 matches the protection domain of the chosen receive queue 948, the message payload data is deposited in the receive queue 948. If a valid completion queue pointer is associated with the receive queue 948, a completion record is posted to the completion queue 956 once the receive work request associated with message 970 has completed. When the receive processing completes, receiving node Y 940 may send an acknowledgment 974 to the sending node X 900 to confirm receipt.

When the acknowledgment arrives at sending node X 900, a completion record for the send request (message 970) may be deposited in the completion queue 916 corresponding to the completion queue descriptor 914 pointed at by the send request. This is only done after first checking that the completion queue protection domain matches the protection domain associated with QP_G 912, and after checking that the completion queue collect buffer id matches the initiating collect buffer ID.

PSW 902 may assign another doorbell (along with an associated collect buffer) to QP_G 912. Also, PSW 902 may map that other doorbell (and associated collect buffer) to another process (e.g. process "C") running on node X 900. Process C can now initiate transfer requests on QP_G 912 to communicate with a receive queue associated with QP_H 952. In addition, PSW 942 on node Y 940 may associate a different receive queue with QP_H 952. In this environment, both process A 902 and process C may communicate through QP_G 912 to QP_H 952 to either receive queue associated with QP_H 952.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for a local compute node to communicate with a remote compute node over an Infiniband network, the method comprising the local compute node:
  establishing an Infiniband Queue Pair (QP) with the remote compute node;
  associating a first process and a second process with the Infiniband QP, wherein the first process executes as a first hardware thread on the local compute node and the second process executes as a second hardware thread on the local compute node;
  sending a first message to a third process executing on the remote compute node via the Infiniband QP, wherein the first message is from the first process, wherein the first message comprises first receive queue information useable for selecting a first receive queue at the remote compute node, wherein the first receive queue is associated with the third process; and sending a second message to a fourth process executing on the remote compute node via the Infiniband QP, wherein the second message is from the second process, wherein the second message comprises second receive queue information useable for selecting a second receive queue at the remote compute node, wherein the second receive queue is associated with the fourth process, wherein the first process and the second process are associated with two different applications executing on the local compute node.

2. The method of claim 1,
wherein associating the first process with the Infiniband QP comprises assigning a first doorbell address and a first collect buffer of the Infiniband QP to the first process, wherein the first doorbell address and the first collect buffer are located in a first address space accessible to the first process;

wherein associating the second process with the Infiniband QP comprises assigning a second doorbell address and a second collect buffer of the Infiniband QP to the second process, wherein the second doorbell address and the second collect buffer are located in a second address space accessible to the second process.

3. The method of claim 2,
wherein the first address space is not accessible to the second process, wherein the second address space is not accessible to the first process.

4. The method of claim 2 further comprising:
receiving a first transfer command in the first collect buffer, wherein the first transfer command is received from the first process;

receiving a first doorbell command at the first doorbell address, wherein the first doorbell command indicates that the first transfer command has been placed in the first collect buffer;

wherein sending the first message to the remote compute node via the Infiniband QP is performed based on receiving the first transfer command and the first doorbell command, wherein the first message comprises at least a portion of the first transfer command;

receiving a second transfer command in the second collect buffer, wherein the second transfer command is received from the second process;

receiving a second doorbell command at the second doorbell address, wherein the second doorbell command indicates that the second transfer command has been placed in the second collect buffer;

wherein sending the second message to the remote compute node via the Infiniband QP is performed based on receiving the second transfer command and the second doorbell command, wherein the second message comprises at least a portion of the second transfer command.

5. The method of claim 1, further comprising:
receiving a first acknowledgement from the remote compute node via the Infiniband QP, wherein the first acknowledgement indicates that the first message has been received;

placing a completion record corresponding to the first message in a first completion queue, wherein the first completion queue is associated with the first process;

receiving a second acknowledgement from the remote compute node via the Infiniband QP, wherein the second acknowledgement indicates that the second message has been received;

placing a completion record corresponding to the second message in a second completion queue, wherein the second completion queue is associated with the second process.

6. A non-transitory computer accessible memory medium comprising program instructions for a local compute node to communicate with a remote compute node over an Infiniband network, wherein the program instructions are executable by a processor to:

establish an Infiniband Queue Pair (QP) with the remote compute node;

associate a first process and a second process with the Infiniband QP, wherein the first process executes as a first hardware thread on the local compute node and the second process executes as a second hardware thread on the local compute node;

send a first message to a third process executing on the remote compute node via the Infiniband QP, wherein the first message is from the first process, wherein the first message comprises first receive queue information useable for selecting a first receive queue at the remote compute node, wherein the first receive queue is associated with the third process; and send a second message to a fourth process executing on the remote compute node via the Infiniband QP, wherein the second message is from the second process, wherein the second message comprises second receive queue information useable for selecting a second receive queue at the remote compute node, wherein the second receive queue is associated with the fourth process, wherein the first process and the second process are associated with two different applications executing on the local compute node.

7. The memory medium of claim 6,
wherein associating the first process with the Infiniband QP comprises assigning a first doorbell address and a first collect buffer of the Infiniband QP to the first process, wherein the first doorbell address and the first collect buffer are located in a first address space accessible to the first process;

wherein associating the second process with the Infiniband QP comprises assigning a second doorbell address and a second collect buffer of the Infiniband QP to the second process, wherein the second doorbell address and the second collect buffer are located in a second address space accessible to the second process.

8. The memory medium of claim 7,
wherein the first address space is not accessible to the second process, wherein the second address space is not accessible to the first process.

9. The memory medium of claim 7, wherein the program instructions are further executable to:
receive a first transfer command in the first collect buffer, wherein the first transfer command is received from the first process;

receive a first doorbell command at the first doorbell address, wherein the first doorbell command indicates that the first transfer command has been placed in the first collect buffer;

wherein the program instructions are executable to send the first message to the remote compute node via the Infiniband QP based on receiving the first transfer command and the first doorbell command, wherein the first message comprises at least a portion of the first transfer command;

receive a second transfer command in the second collect buffer, wherein the second transfer command is received from the second process;

receive a second doorbell command at the second doorbell address, wherein the second doorbell command indicates that the second transfer command has been placed in the second collect buffer;

wherein the program instructions are executable to send the second message to the remote compute node via the Infiniband QP based on receiving the second transfer command and the second doorbell command, wherein the second message comprises at least a portion of the second transfer command.

10. The memory medium of claim 6, wherein the program instructions are further executable to:

receive a first acknowledgement from the remote compute node via the Infiniband QP, wherein the first acknowledgement indicates that the first message has been received;

place a completion record corresponding to the first message in a first completion queue, wherein the first completion queue is associated with the first process;

receive a second acknowledgement from the remote compute node via the Infiniband QP, wherein the second acknowledgement indicates that the second message has been received;

place a completion record corresponding to the second message in a second completion queue, wherein the second completion queue is associated with the second process.

11. A local compute node configured to communicate with a remote compute node over an Infiniband network, the local compute node comprising:

a processing unit; and a memory element coupled to the processing unit and storing programming instructions executable by the processing unit to:

establish an Infiniband Queue Pair (QP) with the remote compute node;

associate a first process and a second process with the Infiniband QP, wherein the first process executes as a first hardware thread on the local compute node and the second process executes as a second hardware thread on the local compute node;

send a first message to a third process executing on the remote compute node via the Infiniband QP, wherein the first message is from the first process, wherein the first message comprises first receive queue information useable for selecting a first receive queue at the remote compute node, wherein the first receive queue is associated with the third process; and send a second message to a fourth process executing on the remote compute node via the Infiniband QP, wherein the second message is from the second process, wherein the second message comprises second receive queue information useable for selecting a second receive queue at the remote compute node, wherein the second receive queue is associated with the fourth process, wherein the first process and the second process are associated with two different applications executing on the local compute node.

12. The local compute node of claim 11, wherein associating the first process with the Infiniband QP comprises assigning a first doorbell address and a first collect buffer of the Infiniband QP to the first process, wherein the first doorbell address and the first collect buffer are located in a first address space accessible to the first process;

wherein associating the second process with the Infiniband QP comprises assigning a second doorbell address and a second collect buffer of the Infiniband QP to the second process, wherein the second doorbell address and the second collect buffer are located in a second address space accessible to the second process.

13. The local compute node of claim 12, wherein the first address space is not accessible to the second process, wherein the second address space is not accessible to the first process.

14. The local compute node of claim 12, wherein the programming instructions are further executable to:

receive a first transfer command in the first collect buffer, wherein the first transfer command is received from the first process;

receive a first doorbell command at the first doorbell address, wherein the first doorbell command indicates that the first transfer command has been placed in the first collect buffer;

wherein the programming instructions are executable to send the first message to the remote compute node via the Infiniband QP based on receiving the first transfer command and the first doorbell command, wherein the first message comprises at least a portion of the first transfer command;

receive a second transfer command in the second collect buffer, wherein the second transfer command is received from the second process;

receive a second doorbell command at the second doorbell address, wherein the second doorbell command indicates that the second transfer command has been placed in the second collect buffer;

wherein the programming instructions are executable to send the second message to the remote compute node via the Infiniband QP based on receiving the second transfer command and the second doorbell command, wherein the second message comprises at least a portion of the second transfer command.

15. The local compute node of claim 11, wherein the programming instructions are further executable to:

receive a first acknowledgement from the remote compute node via the Infiniband QP, wherein the first acknowledgement indicates that the first message has been received;

place a completion record corresponding to the first message in a first completion queue, wherein the first completion queue is associated with the first process;

receive a second acknowledgement from the remote compute node via the Infiniband QP, wherein the second acknowledgement indicates that the second message has been received;

place a completion record corresponding to the second message in a second completion queue, wherein the second completion queue is associated with the second process.

16. A method for a local compute node to communicate with a remote compute node over an Infiniband network, the method comprising at the local compute node: establishing an Infiniband Queue Pair (QP) with the remote compute node; associating a first process and a second process with the Infiniband QP, wherein the first process executes as a first hardware thread on the local compute node and the second process executes as a second hardware thread on the local compute node; receiving a first message from the remote compute node via the Infiniband QP, wherein the first message is for the first process; receiving a second message from the remote compute node via the Infiniband QP, wherein the second message is for the second process, wherein the first process and the second process are associated with two different applications executing on the local compute node;

wherein associating the first process and the second process with the Infiniband QP comprises associating a first receive queue accessible to the first process with the first process and associating a second receive queue accessible to the second process with the second process; wherein the first message comprises first receive queue information for selecting the first receive queue, wherein the second message comprises second receive queue information for selecting the second receive queue;

wherein the method further comprises depositing at least a portion of the first message in the first receive queue based on the first receive queue information and depositing at least a portion of the second message in the second receive queue based on the second receive queue information.

17. The method of claim 16, wherein associating the first process with the Infiniband QP comprises assigning a first doorbell address and a first collect buffer of the Infiniband QP to the first process, wherein the first doorbell address and the first collect buffer are located in a first address space accessible to the first process;

wherein associating the second process with the Infiniband QP comprises assigning a second doorbell address and a second collect buffer of the Infiniband QP to the second process, wherein the second doorbell address and the second collect buffer are located in a second address space accessible to the second process.

18. The method of claim 17, wherein the first address space is not accessible to the second process, wherein the second address space is not accessible to the first process.

19. The method of claim 16, further comprising, sending a first acknowledgement to the remote compute node via the Infiniband QP, wherein the first acknowledgement indicates that the first message has been received, wherein the first acknowledgement is usable by the remote compute node for placing a completion record corresponding to the first message in a first completion queue, wherein the first completion queue is associated with the first process;

sending a second acknowledgement to the remote compute node via the Infiniband QP, wherein the second acknowledgement indicates that the second message has been received, wherein the second acknowledgement is usable by the remote compute node for placing a completion record corresponding to the second message in a second completion queue, wherein the second completion queue is associated with the second process.

\* \* \* \* \*

UNITED STATES PATENT AND TRADEMARK OFFICE
CERTIFICATE OF CORRECTION

| | |
|---|---|
| PATENT NO. | : 9,596,186 B2 |
| APPLICATION NO. | : 12/495586 |
| DATED | : March 14, 2017 |
| INVENTOR(S) | : Johnsen et al. |

It is certified that error appears in the above-identified patent and that said Letters Patent is hereby corrected as shown below:

On the Title Page

On page 2, Column 2, under Other Publications, Line 4, delete "Assocation;" and insert -- Association; --, therefor.

In the Specification

In Column 7, Line 60, delete "OPs" and insert -- QPs --, therefor.

In Column 8, Line 31, delete "OP" and insert -- QP --, therefor.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*